United States Patent
Block et al.

[11] Patent Number: 5,277,722
[45] Date of Patent: Jan. 11, 1994

[54] MANUALLY FED MACHINE FOR THE FORMATION OF TABS ON SHEET STOCK

[75] Inventors: Craig Block, Farmingville; Gerd Hochrain, Seaford, both of N.Y.

[73] Assignee: E-Z Machine Corp., Farmingdale, N.Y.

[21] Appl. No.: 20,868

[22] Filed: Feb. 19, 1993

Related U.S. Application Data

[63] Continuation of Ser. No. 671,004, Mar. 18, 1991, abandoned.

[51] Int. Cl.⁵ .............................................. B32B 31/04
[52] U.S. Cl. .................................... 156/64; 156/216; 156/256; 156/351; 156/353; 156/364; 156/475; 156/517; 156/521
[58] Field of Search ............... 156/351, 353, 64, 212, 156/216, 250, 256, 350, 362, 363, 364, 443, 475, 517, 518, 521

[56] References Cited

U.S. PATENT DOCUMENTS

| | | | |
|---|---|---|---|
| 3,245,859 | 4/1966 | Busk | 156/216 X |
| 4,504,336 | 3/1985 | Talalay | 156/363 |
| 4,698,114 | 10/1987 | Lowe | 156/362 |
| 4,710,256 | 12/1987 | Ladewig et al. | 156/216 X |

Primary Examiner—David A. Simmons
Assistant Examiner—J. Sells
Attorney, Agent, or Firm—Herbert Dubno; Andrew Wilford; Yuri Kateshov

[57] ABSTRACT

A manual feed machine for the application of tabs to sheet stock has a strip feeder for feeding a foil strip into the path of a sheet which is manually insertable beneath the cutter for the file strip to entrain a previously cut segment into the heating jaws. A die cutter downstream of the foil application can cut the tab after the jaw opens and the sheet is transported to the cutter. Only after the perimeter of the sheet has cleared the blade, is the previously advanced foil strip cut to form the next segment.

20 Claims, 6 Drawing Sheets

MANUALLY FED MACHINE FOR THE FORMATION OF TABS ON SHEET STOCK

This is a continuation of co-pending application Ser. No. 07/671,004 filed on Mar. 18, 1991, abandoned.

FIELD OF THE INVENTION

Our present invention relates to a machine or apparatus which is manually fed with sheet stock for the formation of tabs of a thermoplastic foil material capable of being thermally bonded to the sheet stock and in which the tabs may be optionally delineated by die cutting. More particularly, the invention relates to the automatic application of a foil segment to an edge of sheet stock so that the foil segment extends only over a portion of that edge.

BACKGROUND OF THE INVENTION

It is known to apply a synthetic resin foil to an edge of a sheet of sheet stock, i.e. paper, paperboard, cardboard or other precut web-like material utilizing a thermal-bonding process and automatic feed of the sheets through the machine. Reference may be had, for example, to the commonly-owned U.S. Pat. Nos. 3,925,144, 3,926,713, and 4,698,114 which describe principles of the feeding of synthetic resin foil strip material, principles of the feeding of the sheets to which the foil strips are to be applied, principles of thermally bonding the foil strips to the sheets and principles of the die-cutting or punching of tabs or the like on such sheets which may be used in the present invention and which represent prior art to the present invention.

There has developed a need for a manually operated, simple and reliable machine which is capable of providing sheets having foil-strip segments straddling an edge of the sheet and bonded to opposite faces thereof only over a portion of that length, the sheet being optionally die-cut so that the portion bearing the foil strip segment defines a projecting tab of the sheet.

OBJECTS OF THE INVENTION

It is, therefore, the principal object of the present invention to provide an improved machine for applying foil strip segments to a portion of an edge region of a sheet stock in the production of tabbed sheets.

Another object of this invention is to provide a manually fed machine or apparatus for the purposes described which will have high reliability, is easy to use, set up and adjust, and which will be free from drawbacks affecting other machines for the production of tabbed sheets.

SUMMARY OF THE INVENTION

These objects, and others which will become apparent hereinafter, are attained, in accordance with the present invention, in an apparatus for applying a foil tab to a sheet which comprises:

a pair of juxtaposed elongated heated jaws adapted to receive an edge of a sheet fed in an in-feed direction between the jaws along a sheet path generally perpendicular to the jaws and with a folded foil strip segment straddling the edge and pneumatically actuatable to seal the strip along opposite surfaces of the sheet;

means for feeding a folded foil strip along a strip path into the path of the edge in a strip-feed direction perpendicular to the sheet in-feed direction and at a location upstream of the jaws with respect to the in-feed direction;

a pneumatically actuated cutter disposed along the strip path inwardly of a perimeter of the sheet; and circuit means including a first switch tripped by the sheet upon displacement thereof along the sheet path and upon engagement of the sheet with the strip segment for actuating the jaws after a predetermined time delay and for a predetermined dwell period, a second switch operated by the sheet upon withdrawal thereof from the jaws for initiating cutting of the strip to form a successive segment after the sheet clears the cutter, and means for operating the means for feeding to advance the strip by a length corresponding to a length of the segment beneath the sheet prior to withdrawal of the sheet from the jaws.

According to a feature of the invention, the means for feeding comprises a switch actuated upon advance of the strip to enable operation of the cutter in response to the second switch. This, of course, prevents the operation of the cutter before the feeding of the incremental length of the strip required to form the foil segment is completed. The strip can be fed by a rotary pneumatic drive, i.e. a pneumatic cylinder of the angular-displacement type, which can be coupled to a pair of feed rollers receiving the strip between them.

Means can be provided for pressing one of the feed rollers toward the other feed roller and, of course, for relieving the pressing force when the folded strip is to be inserted between the feed rollers. Gearing can couple the rotary pneumatic drive to the feed roller which is driven.

The driven feed roller may be connected with the drive, in addition, by a one-way clutch which may be provided between the drive and the gearing in the gear train, between the gear train and the driven roller shaft or, preferably, between the driven roller shaft and the driven roller. It has been found to be advantageous, moreover, to provide a second one-way clutch for the entrained roller as well, preferably between this roller and a housing part in which this roller is journaled, to eliminate backlash in the rotation of this roller or any rearward movement of the strip entrained between the two rollers.

According to another feature of the invention, a die cutter is provided adjacent the foil applicator portion of the apparatus and preferably on a common machine frame therewith, the die cutter extending laterally of the jaws in a direction parallel to the jaws whereby transport of the sheet in a direction perpendicular to the in-feed direction and parallel to the jaws into the die cutter enables die cutting of the sheet to delineate the tab.

According to a further feature of the invention, the table of the foil applicator portion of the apparatus is provided with a driven sheet-transport member, for example, an endless belt or a roller, and a solenoid-controlled pressing roller is mounted above the table and is energized in timed-relation with the opening of the jaws to displace the two from between the jaws into the die cutter.

The circuit means can include means for disabling the solenoid for manual operation of the apparatus without die cutting of the tab. The transport belt forming the sheet transport member of the table can extend into the die cutter to form the sheet transporter therein.

Alternatively, the sheet transporter in the die cutter may be an independently driven transport belt or a plurality of spaced-apart driven rollers against which the sheet is held by a pressing member.

According to a further feature of this invention, the die cutter is formed with a fixedly positioned tabbing die for defining one side of the tab and a movably positioned tabbing die adapted to be disposed at an adjustable distance form the fixedly positioned tabbing die to define the opposite side thereof, the tabbing dies cutting away the edge of the sheet adjacent the portion to which the foil segment has been applied. The tabbing dies can be modular units, each consisting of an upper and a lower die half. The modular units can be replaceably mounted between common plates. It has been found to be advantageous to actuate the dies by a conventional eccentric drive system, but to provide a pneumatic cylinder below this plate and to provide that pneumatic cylinder with a manually controlled valve which, when needed, is actuated by service personnel to lift the upper one of the plates into a position in which the modular die units can be removed and replaced.

According to a feature of the invention, the rotary pneumatic drive comprises a pair of relatively angularly displaceable blocks establishing an angular stroke of the drive and a scale in metric or English units for the setting of these blocks whereby the length of the foil segment can be set.

According to another feature of this invention, the machine frame carries all of the aforementioned means and can be connected to a compressor for supplying all of the pneumatically actuated elements of the apparatus through a main pressure valve. The circuit means includes a lamp in circuit with the main pneumatic valve for signalling readiness of the air pressure source.

Should either the lamp or the valve fail, the lack of illumination of the lamp will signal to the operator the fact that the system is not in readiness so that the lamp can provide a reliable indication that the main supply valve is open.

The invention also comprises a method of applying the foil strips or of operating the machine which has been described which comprises the steps of:

(a) manually advancing in a sheet-infeed direction a sheet along an infeed path perpendicular to a pair of heated jaws so that a leading edge of the sheet entrains a segment of a folded foil strip which thereupon straddles the edge;

(b) continuing to advance the sheet with the segment straddling the edge between the jaws;

(c) automatically in timed relation with advance of the sheet in the direction, closing the jaws and maintaining the jaws closed for a predetermined dwell period sufficient to bond the segment to opposite faces of the sheet, the jaws thereupon opening;

(d) during step (c), automatically in response to opening of the jaws, advancing the strip from a supply thereof in a strip-feed direction perpendicular to the sheet-infeed direction below the sheet for a length increment equal to a length of the segment;

(e) withdrawing the sheet from between the jaws;

(f) automatically in response to withdrawal of the sheet from between the jaws, cutting a new segment from the length of advanced strip; and (g) repeating steps (a) through (f) with successive sheets.

As noted, the sheet can be withdrawn in a direction perpendicular to the sheet in-feed direction, for example when the sheet is to be fed to the die cutter. It may, if desired, be withdrawn by the operator in a direction opposite to the sheet in-feed direction where the sheet carrying the foil strip is to be stacked for subsequent die cutting or marketing without die cutting.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
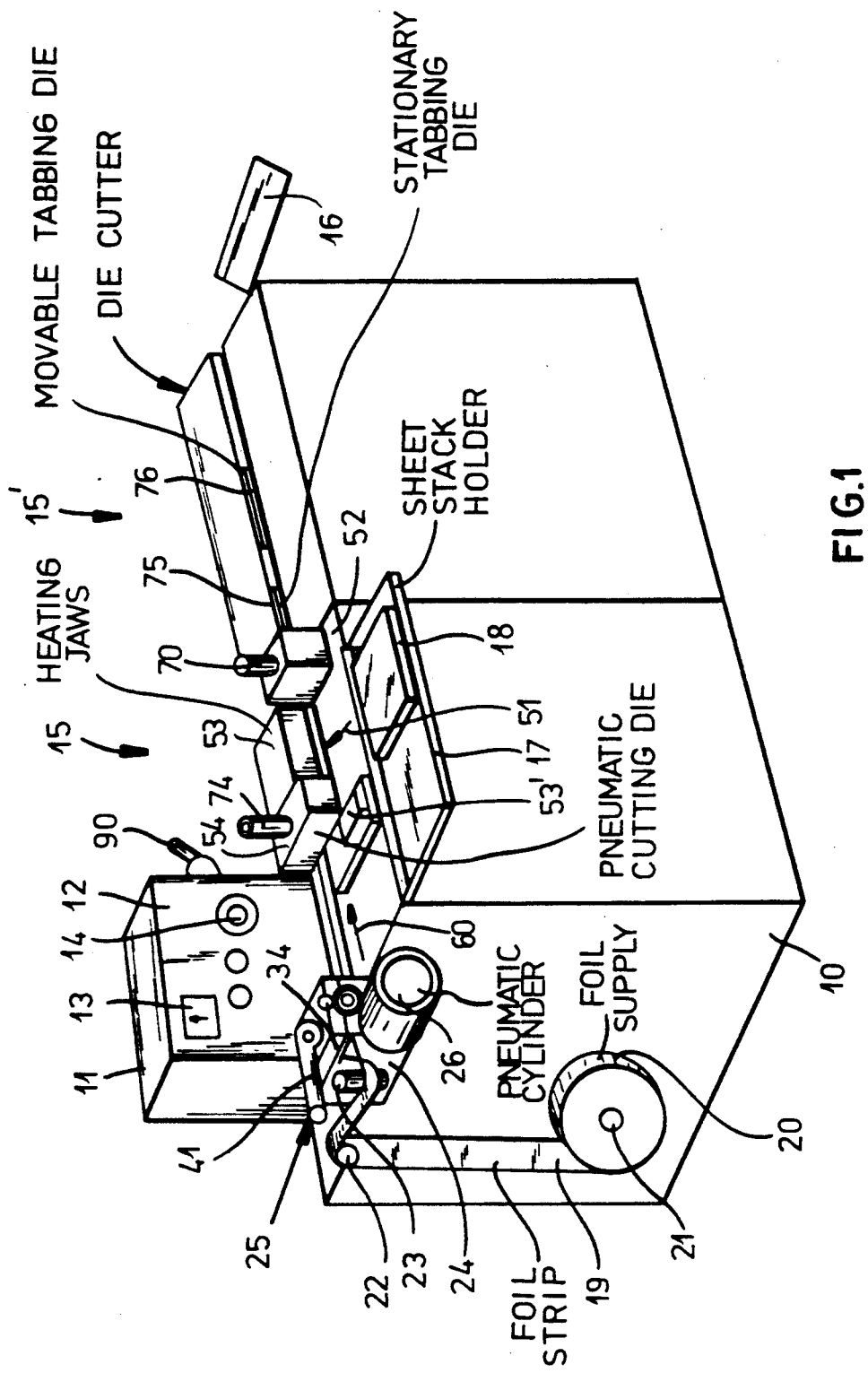
FIG. 1 is a highly diagrammatic perspective overview of the apparatus of the invention.

In FIG. 1 we have shown a machine frame or housing 10 which is provided with a housing 11 for the electrical circuitry and which can include a panel 12 provided with various control switches, temperature gauges 13 represented only diagrammatically and showing the temperatures of the heat-sealing jaws and a lamp 14 for signalling the readiness of the pneumatic supply. It is possible to see that the housing comprises two sections 15 and 15', respectively constituting the foil applicator section and the die-cutting section. A collecting tray 16 at the downstream side of the die-cutter section 15' can receive the tabbed sheet stock and a sheet-stock holder 17 at the strip applicator section 15 can hold the stack 18 of sheets to be provided with the foil strips.

Figure 2:
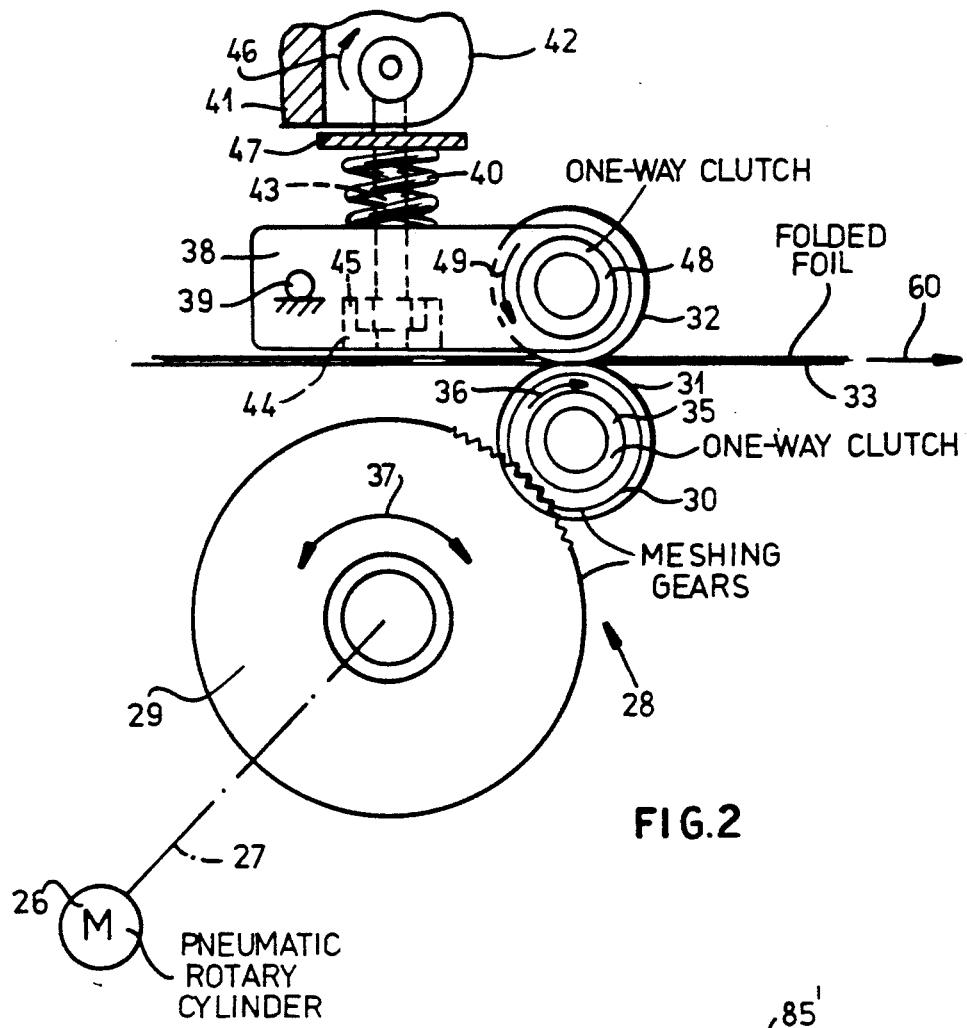
FIG. 2 is a detail view illustrating the principles of the means for feeding the folded foil strip.

According to the invention, the foil strip 19 from a foil-supply roll 20 mounted upon a holder 21 can be fed via rollers 22 and 23 to a guide block 24 of a strip-feeding mechanism represented generally at 25 (see FIG. 2). The mechanism comprises a pneumatic rotary cylinder represented generally at 26 in FIG. 1 and schematically in FIG. 2.

The pneumatic cylinder is coupled, as represented by the line 27 (FIG. 2), with a gear train 28 having, for example, a drive gear 29 and a pinion 30 with the milled-surface drive roller 31. A pressing roller 32, which also has a milled surface, presses the folded foil 33 against the roller 31, the foil being folded at 34 as it enters the guide block 24.

As is also apparent from FIG. 2, the gear train 28 is connected to the roller 30 by a one-way clutch 35 so that the roller 30 is driven intermittently but always in the direction represented by the arrow 36 as the gear 29 is angularly displaced as represented by the arrow 37 by the pneumatic rotary cylinder 26.

The roller 32 can be pressed against the foil 33 by a housing part 38 pivotally mounted at 39 to the guide block 24 and biased by a spring 40 in the direction of the roller 30. To relieve the pressing force on the folded foil strip 33, a handle 41 having a cam surface 42 can be pivotally connected to a draw bolt 43 seated by a nut 44 in a recess 45 in the housing part 38. When the handle 41 is swung upwardly (arrow 46), the housing part 38 is drawn upwardly relative to a housing part 47 which can form part of the guide block 24 to compress spring 40 and relieve the pressure of the spring on the housing part 38 and hence the pressing roller 32. A further one-way clutch 48 is provided between the roller 32 and the housing part 38 to ensure rotation only in the direction of the arrow 49 without any reverse rotation.

Figure 4:
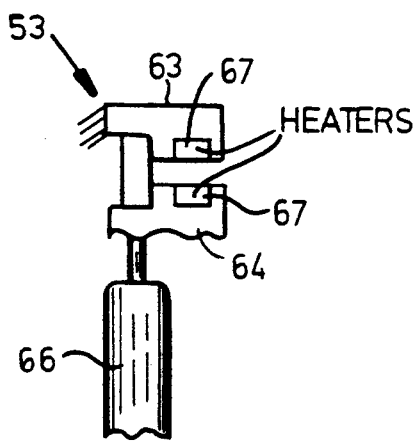
FIG. 4 is a diagrammatic view of the heated jaw assembly.
Figure 5:
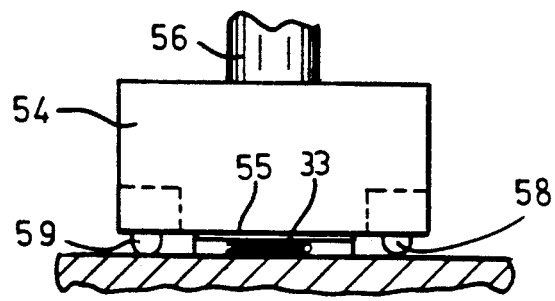
FIG. 5 is a cross sectional view through the table showing the cutter assembly in elevation and the switches which control the machine operation.
Figure 7A:
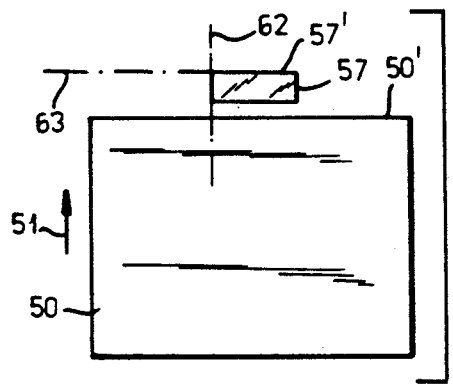
FIGS. 7A-7C are diagrams illustrating successive steps in the operation of the apparatus.
Figure 7B:
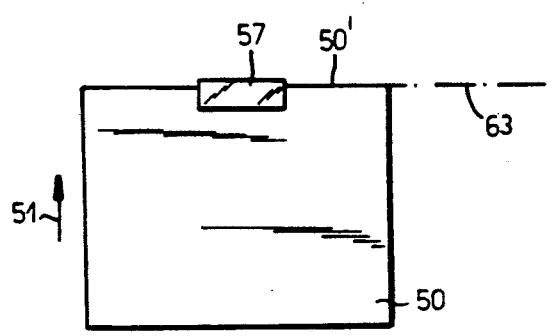
Figure 7C:
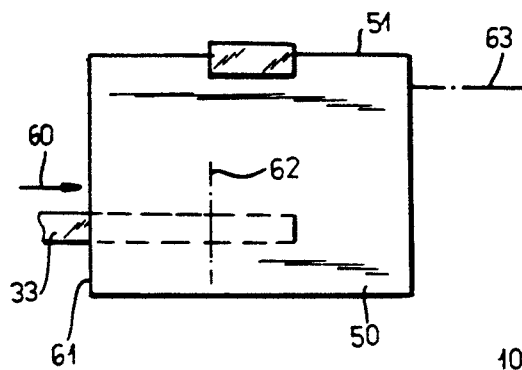

The mechanism 25 feeds the folded foil below a sheet 50 (FIG. 7A) from the stack 18 as that sheet is advanced in the direction of arrow 51 along the table 52 and against the edge guide 53' toward a pair of heating jaws 53 which are described in greater detail with respect to FIG. 4. First, however, the strip 33 passes through a pneumatically operated cutter which is represented at 54.

Figure 3:
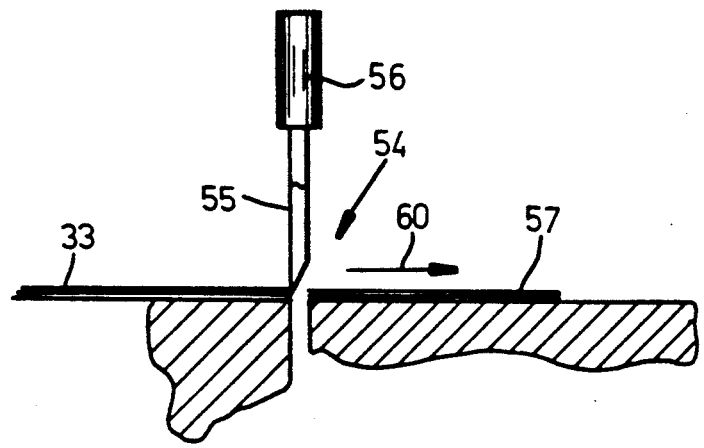
FIG. 3 is a diagrammatic illustration of the cutter which may be used.

The cutter 54 has been symbolically represented in FIG. 3 and comprises a blade 55 displaceable by a pneumatic cylinder 56 to sever a segment 57 from the folded foil strip. Any of the foil-strip cutters described in the aforementioned patents can be used as the practical embodiment of the cutter for the purposes of this invention. The cutter assembly also has a pair of sensitive switches 58 and 59 whose functions will be described in greater detail below but which are engaged in succession by the sheet as it is displaced in the in-feed direction. The strip feed direction is represented at 60 in FIG. 1 and in FIGS. 2 and 3. The cutter is located within the perimeter 61 of the sheet 50 (see FIG. 7A-7F) at a location represented by the cutter line 62, the strip being fed along the reference line 63.

The jaws of the heated jaw assembly 53 are represented at 63' and 64, and can be drawn apart or pressed together by the cylinder 66 and can have heating units 67 which are heated to a temperature sufficient to heat-seal the foil strip 57 to the opposite surfaces of the sheet 50.

Figure 6A:
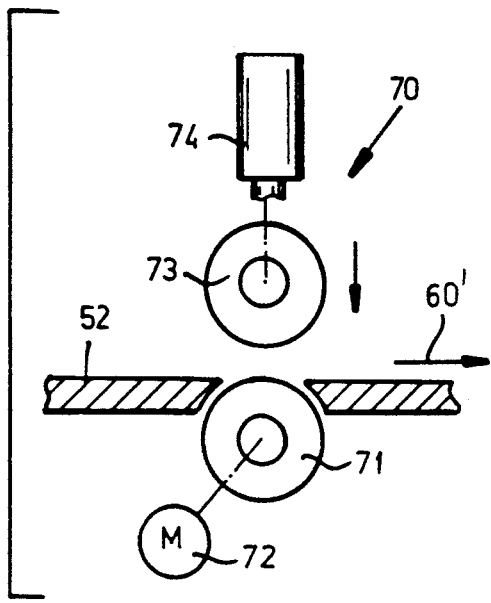
FIG. 6A is a cross sectional view illustrating diagrammatically one kick-out system for removing the sheet from the jaws.

The table 52 is provided with a device represented at 70 and which is actuatable to "kick out" the sheet to which the foil strip has been applied in the direction of the die cutter 15'. To this end, the table 52 can be provided (as shown in FIG. 6A) with a drive roller 71 driven by a motor 72 and against which a sheet can be pressed by a pressing roller 73 displaced outwardly by a solenoid 74 and spring-biased upwardly. When the solenoid 74 is energized, a sheet engaged between the rollers 71 and 73 will be displaced in the direction of arrow 60', i.e. a direction perpendicular to the direction 51 but parallel to the jaws of the heated jaw assembly 53, i.e. in the same direction as is represented by the arrow 60.

The jaws 53, the cutter assembly 54, the kick-out assembly 70 and the guide 53' may be all adjusted as to position in the direction of the arrow 60 and 60' for the length of the sheet to be provided with the tab and for the location of the foil strip applied to the tab.

Figure 6B:
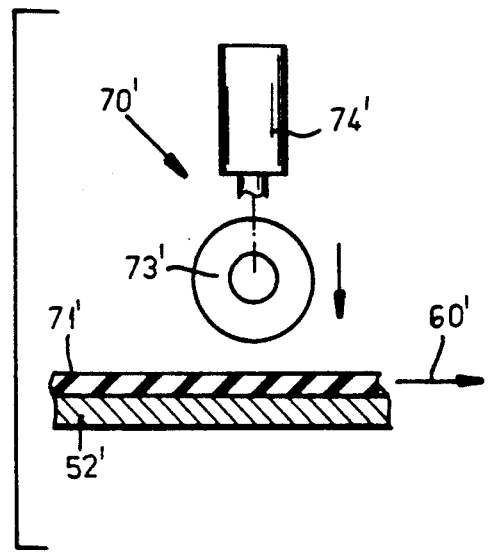
FIG. 6B is a view similar to FIG. 6A showing another system for removing the sheet from the jaws.

Alternatively to the arrangement shown at 70 in FIG. 6A, the kick-out assembly 70' shown in FIG. 6B may have a pressing roller 73' cooperating with a continuously driven endless belt 71' displaceable in the direction of arrow 60' on the table 52', the roller 73' being actuated by the solenoid 74'.

The die cutter 15' may, of course, be any of the die-cutting units illustrated in the aforementioned patents.

Figure 10:
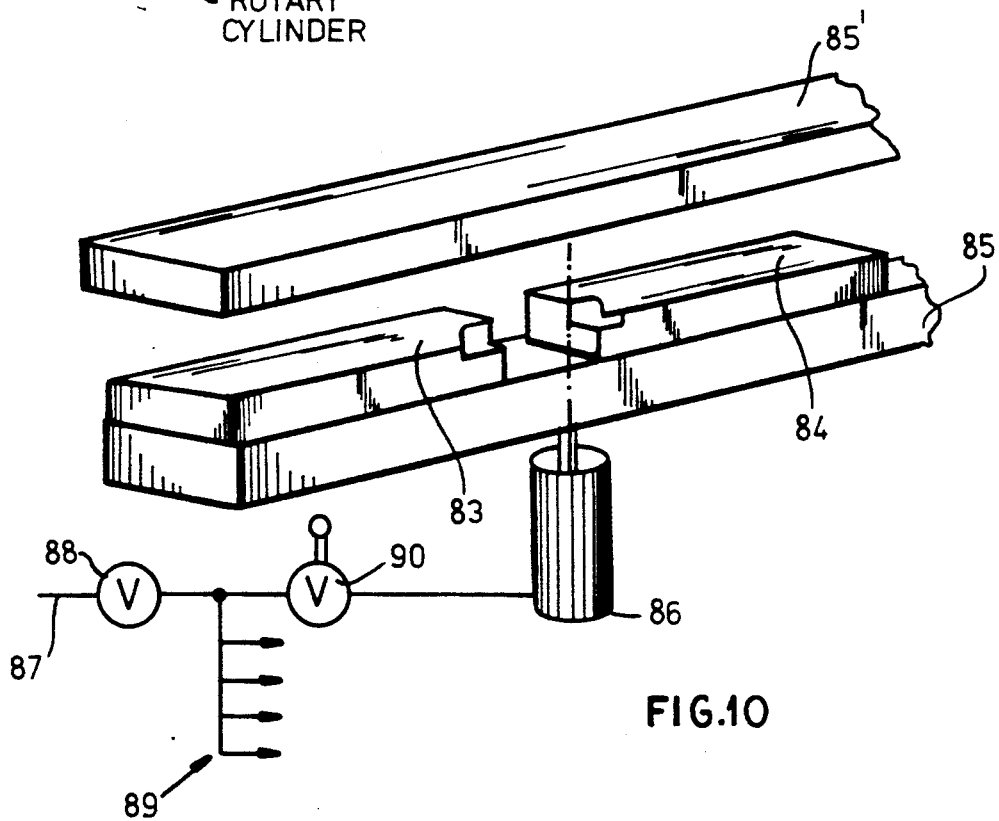
FIG. 10 is a diagram illustrating another feature of the die-cutting portion of the apparatus.
Figure 8:
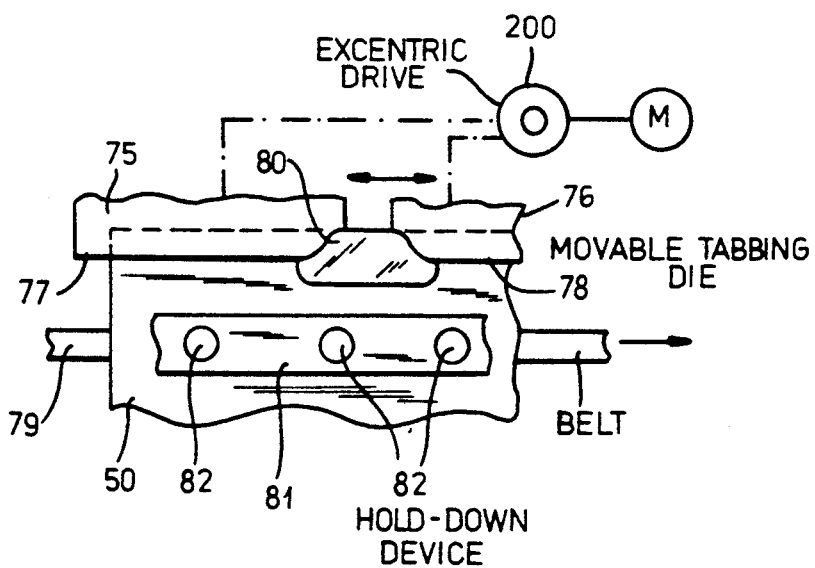
FIG. 8 is a plan view showing the die-cutting operation.

In general, the die cutter will include a stationary tabbing die 75 and an adjustably positioned tabbing die 76, the tabbing dies being provided as modular units, only the upper portions of which are visible in FIGS. 1 and 8. As can be seen from FIG. 8, the cutting jaws 77 and 78 of the dies 75 and 76 (driven by a conventional eccentric drive) delimit a tab 80 which projects beyond the die-cut edge of the sheet 50 which is moved into position by the belt 79 and is held against the belt by a hold-down device comprising a bar 81 in which balls 82 are received. The means for stopping the sheet in position to be die-cut are conventional in the art and are described, for example, in the aforementioned patents. After die cutting, the sheet is deposited in the tray 16 previously described. As is visible in FIG. 10, where we have only shown the lower die halves 83 and 84 of the modular die, the dies can be mounted between plates 85, 85' for actuation by the eccentric drive 200 shown diagrammatically in FIG. 8. A pneumatic cylinder 86 can be pressurized from the pressure source 87 which is provided with an electromagnetically controlled main valve 88 supplying the manifold 89 running to the pneumatically driven elements of the machine. The pneumatic cylinder 86 lifts the upper plate of the die assembly to raise the latter for service or removal.

More specifically, it has been found to be advantageous to provide a manually operated valve 90 (see FIGS. 1 and 10), which can be located on the side of the housing 11, to enable the use of the pneumatic cylinder 86 to lift the plate 85' and thereby permit ready adjustment or replacement of the die units.

Figure 9:
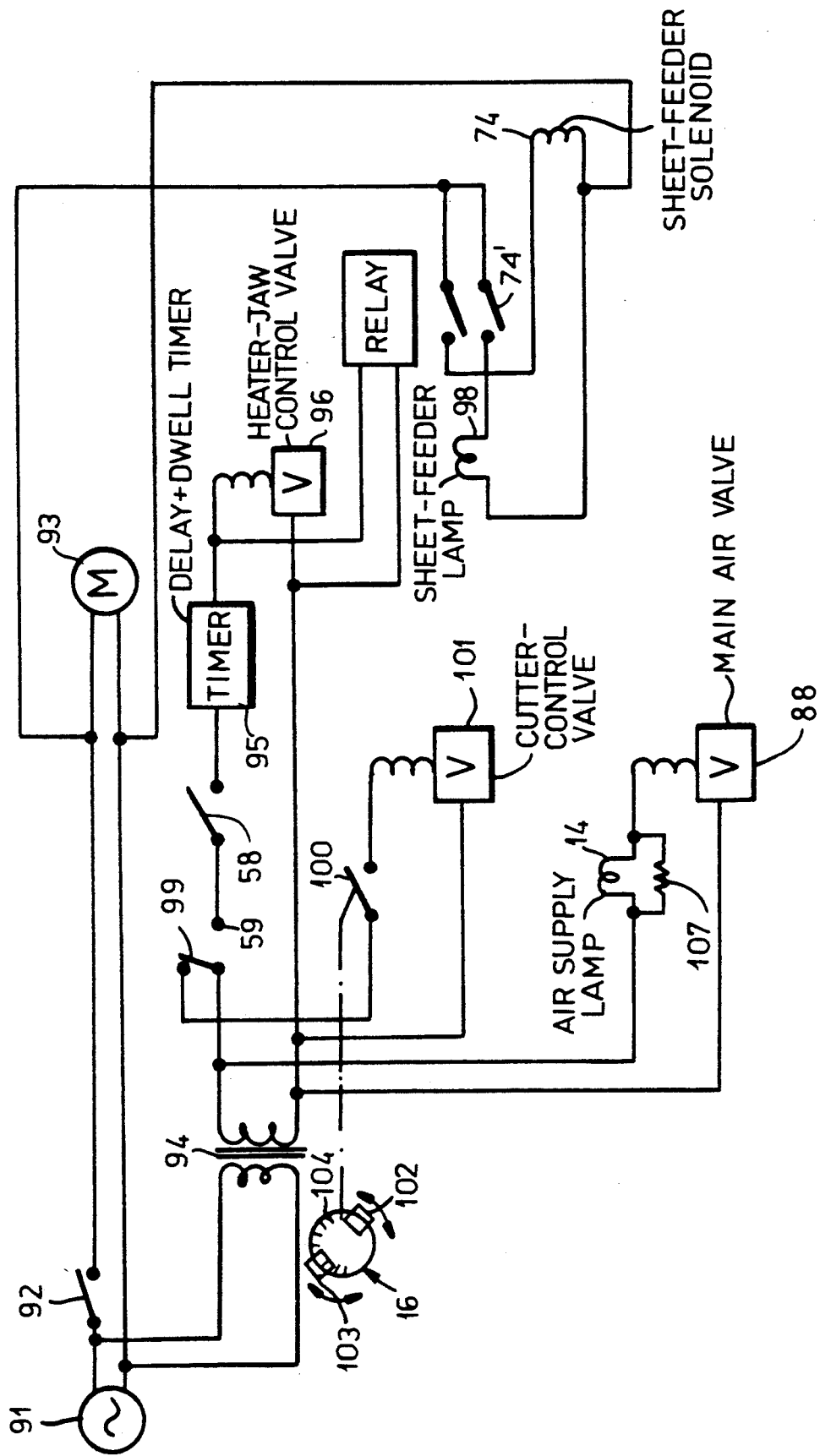
FIG. 9 is a circuit diagram for the apparatus.

In FIG. 9 we have shown a portion of the circuitry required for operating the apparatus in a highly diagrammatic form, it being understood that the motor control relay, the circuitry for changing the voltages so that, for example, a 24 volt circuit can be used for certain control purposes and a 120 volt circuit can be used for other control purposes while the motor 93 is driven at 230 volts, have not been illustrated, nor have we illustrated the circuitry for the motors driving the belts or feed rollers.

The mains electrical source is represented at 91 and feeds the main switch 92 which, when closed, supplies the motor 93 driving the belt or feed rollers of the die-cutting portion 15' of the apparatus. When the main switch is open circuited, the solenoid 74 is cut off by means including a switch 74' and the tab cutter is inoperative. The source 91 also applies current to a transformer 94 for providing control voltages. The switches 58 and 59 of the cutter unit 54 are connected in series with a timing circuit 95 establishing a delay and a dwell time for operating the electromagnetically controlled valve 96 which, in turn, pneumatically operates the heater jaws.

Specifically, the heater jaws are closed with a predetermined time-delay after closure of the switches 59 and 58 in succession as the sheet is fed in the in-feed direction between the heater jaws. It opens the heater jaws after a predetermined dwell time sufficient to bond the foil segment to the opposite surfaces of the sheet 50.

Upon opening of the jaws, the timing circuit causes the operation of the sheet feeder of solenoid 74, provided that the switch 92 for kick-out of the sheet to the die cutter has been closed. The switch 92 and the pilot lamp 98, indicating that the sheet feeder for feeding the sheets to the die cutter has been turned on, can be mounted on the panel 12.

The opening of switch 59 closes contacts 99 in series with a sensitive switch 100 to operate the cutter control valve 101. The sensitive switch 100 is actuated by a block 102 on the rotary cylinder strip feeder 26 previously described. The blocks 102 and 103 are angularly adjustable on the strip feeder with respect to a scale 104 which has been shown highly diagrammatically and can be a dimensioned English or metric distance scale representing the increment of feed of the strip prior to cutting and can be provided along a cylindrical portion of the rotary cylinder or on a disk surface thereof. The switch 100 ensures that feed of the strip will have been completed prior to actuation of the cutter.

The clutch of the eccentric drive 200 is operated to cut the tab when another sensitive switch along the path of the sheet is closed and after the sheet has been brought to standstill. Such control of the die cutter is conventional in the art.

The main air valve 88 is connected in series with a pilot lamp 14, which can be bridged by a resistor 107, to be certain that the lamp 14 always reflects the status of the main air valve.

Referring now to FIGS. 7A-7F, it can be assumed that a strip 57 has been previously cut along the cut line 62 and is exposed to the leading edge 50' of a sheet 50 fed in the direction of the in-feed arrow 51, the balance of the foil strip being covered by a plate beneath which that strip is fed onto the table 52.

Since the strip segment 57 is folded along its edge 57' and is open toward the oncoming sheet 50', the segment 57 will be engaged by the leading edge 50' (FIG. 7B) and will continue to be entrained as the operator feeds the sheet into the machine in the direction of the arrow 51 until the strip 57 enters the jaws 53. The jaws are then closed for the predetermined dwell time as noted and when the jaws open, the strip 33 is advanced in the direction of the arrow 60 by a length equal to the length of the segment 57 past the cutting line 62.

Figure 7D:
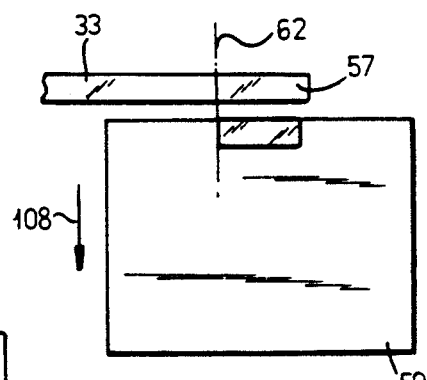
FIGS. 7D and 7E are views similar to FIGS. 7A-7C showing alternatives as to the movement of the sheet after the jaws have opened.
Figure 7E:
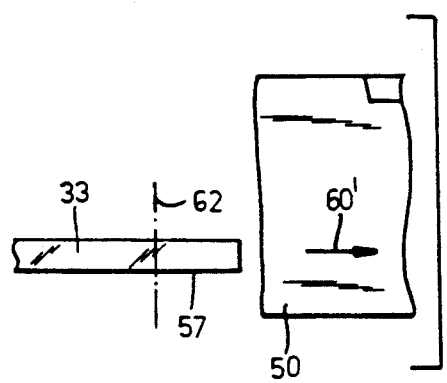
Figure 7F:
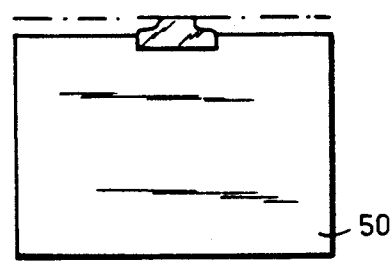
FIG. 7F is a similar diagram illustrating the die-cutting step.

However, since the cutting line 62 lies within the perimeter 61 of the sheet 50 (FIG. 7C), cutting cannot occur at this time. Accordingly, the sheet must be withdrawn, e.g. in the direction of the arrow 108 as shown in FIG. 7D. When the switch 59 is tripped upon such retraction of the sheet 50, cutting occurs along the line 62 to form a new segment 57 and the sheet 50 can be stacked and the process repeated with another sheet from the stack 18. When the switch 92 is turned on, however, when the jaws open, the solenoid 74 or 74' is actuated to displace the sheet 50 in the direction of arrow 60', thereby again operating the switch 59 to allow cutting along the line 62 to form a new segment permitting the cycle to be repeated.

We claim:

1. A method of operating a machine for applying tabs to a sheet, the method comprising the steps of sequentially:
   (a) manually advancing in a sheet-infeed direction a sheet along an infeed path perpendicular to a pair of heated jaws so that a leading edge of the sheet engages in a segment of a folded foil strip with the strip segment straddling the edge;
   (b) continuing to advance the sheet in the sheet-infeed direction with the segment straddling the edge until the sheet edge and strip segment straddling it are positioned between the jaws;
   (c) automatically in timed relation with advance of the sheet in the sheet-infeed direction, closing the jaws on the edge straddled by the segment and maintaining the jaws closed for a predetermined dwell period sufficient to bond the segment to opposite faces of the sheet and thereafter opening the jaws;
   (d) automatically in response to opening of the jaws, advancing the strip form a supply thereof in a strip-feed direction perpendicular to the sheet-infeed direction below the sheet for a length increment equal to a length of the segment to a position aligned with and upstream of the jaws in the sheet-infeed direction;
   (e) withdrawing the sheet with the segment bonded to its edge from between the jaws;
   (f) automatically in response to withdrawal of the sheet from between the jaws, cutting a new segment from the length of advanced strip aligned in the sheet-infeed direction with the jaws; and
   (g) repeating steps (a) through (f) with successive sheets.

2. The method defined in claim 1 wherein in step (e) the sheet is withdrawn in a direction opposite the sheet-infeed direction.

3. The method defined in claim 1 wherein in step (e) the sheet is withdrawn in a direction perpendicular to the sheet-infeed direction.

4. The method defined in claim 1, further comprising the step of
   die cutting the edge to delineate the tab.

5. A machine for applying tabs to a sheet, the machine comprising:
   a pair of heated jaws;
   means including a support table for manually advancing in a sheet-infeed direction a sheet along an infeed path perpendicular to the pair of heated jaws so that a leading edge of the sheet engages in a segment of a folded foil strip with the strip segment straddling the edge and for continuing to advance the sheet in the sheet-infeed direction with the segment straddling the edge until the sheet edge and strip segment straddling it are positioned between the jaws;
   means including a first switch for, automatically in timed relation with advance of the sheet in the sheet-infeed direction, closing the jaws on the edge straddled by the segment and maintaining the jaws closed for a predetermined dwell period sufficient to bond the segment to opposite faces of the sheet and thereafter opening the jaws;
   means including a second switch for, automatically in response to opening of the jaws, advancing the strip from a supply thereof in a strip-feed direction perpendicular to the sheet-infeed direction below the sheet for a length increment equal to a length of the segment to a position aligned with and upstream of the jaws in the sheet-infeed direction; and
   operating means for withdrawing the sheet with the segment bonded to its edge from between the jaws and for automatically in response to withdrawal of the sheet from between the jaws, cutting a new segment from the length of advanced strip aligned in the sheet-infeed direction with the jaws.

6. An apparatus for applying a foil tab to a sheet, the apparatus comprising:
   a pair of juxtaposed elongated heated jaws adapted to receive an edge of a sheet fed in a sheet in-feed direction to a sealing position thereof corresponding to receiving of the edge between the jaws along a sheet path extending in the sheet infeed direction generally perpendicular to the jaws and with a folded foil strip segment having a length and straddling the edge, the jaws being pneumatically actuatable to seal the strip segment along opposite surfaces of the sheet when the sheet is in the sealing position;
   means for feeding a folded foil strip along a strip path into the path of the edge in a strip-feed direction perpendicular to the sheet in-feed direction and at a location upstream of the jaws with respect to the sheet in-feed direction and aligned with the jaws in the sheet in-feed direction;
   a pneumatically actuated cutter disposed along the strip path inwardly of a perimeter of the sheet for cutting the strip into the segments of the length in a cutting position spaced upstream in the sheet in-feed direction from the jaws; and
   circuit means including
      a first switch tripped by the sheet upon displacement thereof along the sheet path and upon engagement of the sheet with the strip segment for actuating the jaws after a predetermined time delay and for a predetermined dwell period,
      a second switch operated by the sheet upon withdrawal thereof from the jaws for initiating cutting of the strip to form a successive segment after the sheet clears the cutter, and
      means for operating the means for feeding to advance the strip beneath the sheet prior to withdrawal of the sheet from the sealing position by a length corresponding to the length of the segment.

7. The apparatus defined in claim 6 wherein the means for feeding comprises
   a switch actuated by the means for feeding upon the advance of the strip to enable operation of the cutter in response to the second switch, the cutter being movable in the sheet in-feed direction to the current position upon withdrawal of the sheet from the sealing position.

8. The apparatus defined in claim 6 wherein the means for feeding comprises
   a rotary pneumatic drive,
   a pair of feed rollers receiving the strip between them,
   means for pressing one of the feed rollers toward the other of the feed rollers, and
   gearing connecting the drive with one of the rollers and including a one-way clutch.

9. The apparatus defined in claim 8 wherein the other of the rollers is rotatable relative to a housing part, the means for feeding further comprising
   another one-way clutch between the other roller and the housing part preventing reverse rotation of the other roller.

10. The apparatus defined in claim 6, further comprising
   a die cutter extending laterally of the jaws in a direction parallel to the jaws whereby transport of the sheet in a strip-feed direction perpendicular to the sheet in-feed direction and parallel to the jaws into the die cutter enables die-cutting of the sheet to delineate the tab.

11. The apparatus defined in claim 10, further comprising
   a table on which the sheet is displaceable along the infeed path, the table being formed with a driven sheet-transport member below the sheet for displacing the sheet into the die cutter along the strip path, and
   a solenoid-controlled pressing roller mounted above the table and energized in timed relation with opening of the jaws for automatically displacing the sheet into the die cutter.

12. The apparatus defined in claim 11 wherein the circuit means includes means for disabling the solenoid so that the pressing roller is not actuated and the sheet is withdrawn manually from the jaws upon sealing parallel to the sheet in-feed direction without die cutting of the tab.

13. The apparatus defined in claim 11 wherein the sheet-transport member is a belt.

14. The apparatus defined in claim 13 wherein the transport belt for the sheet extends along the die cutter.

15. The apparatus defined in claim 11 wherein the sheet-transport member is a driven roller.

16. The apparatus defined in claim 10 wherein the die cutter is formed with a fixedly positioned tabbing die for defining one side of the tab and a movably positioned tabbing die adapted to be disposed at an adjustable position from the fixedly positioned tabbing die.

17. The apparatus defined in claim 16 wherein the tabbing dies are modular units each consisting of an upper and a lower die half and are replaceably mounted between respective upper and lower plates, the apparatus further comprising
   a pneumatic cylinder connected with the upper plate for lifting same and enabling servicing of the dies.

18. The apparatus defined in claim 17 wherein the pneumatic cylinder is provided with a manually operable valve enabling lifting of the upper plate for removal and replacement of one of the modular units.

19. The apparatus defined in claim 8 wherein the rotary pneumatic drive comprises a pair of displaceable blocks, each of the blocks being angularly adjustable to establish an angular stroke of the drive, and a scale with respect to which the blocks are positionable.

20. The apparatus defined in claim 6, further comprising
   a machine frame carrying all of the means and provided with means for supplying all pneumatically actuated elements of the apparatus with compressed air, the circuit means including a main pneumatic valve and an indicator lamp in series with the main pneumatic valve for signalling readiness of an air pressure supply.

* * * * *